Patented Sept. 27, 1938

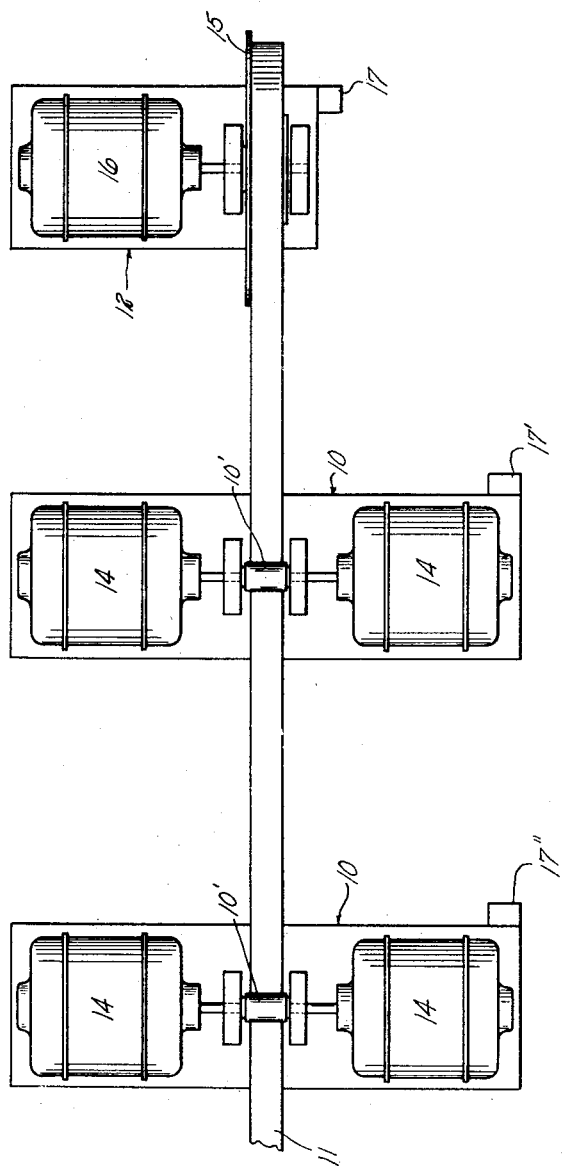

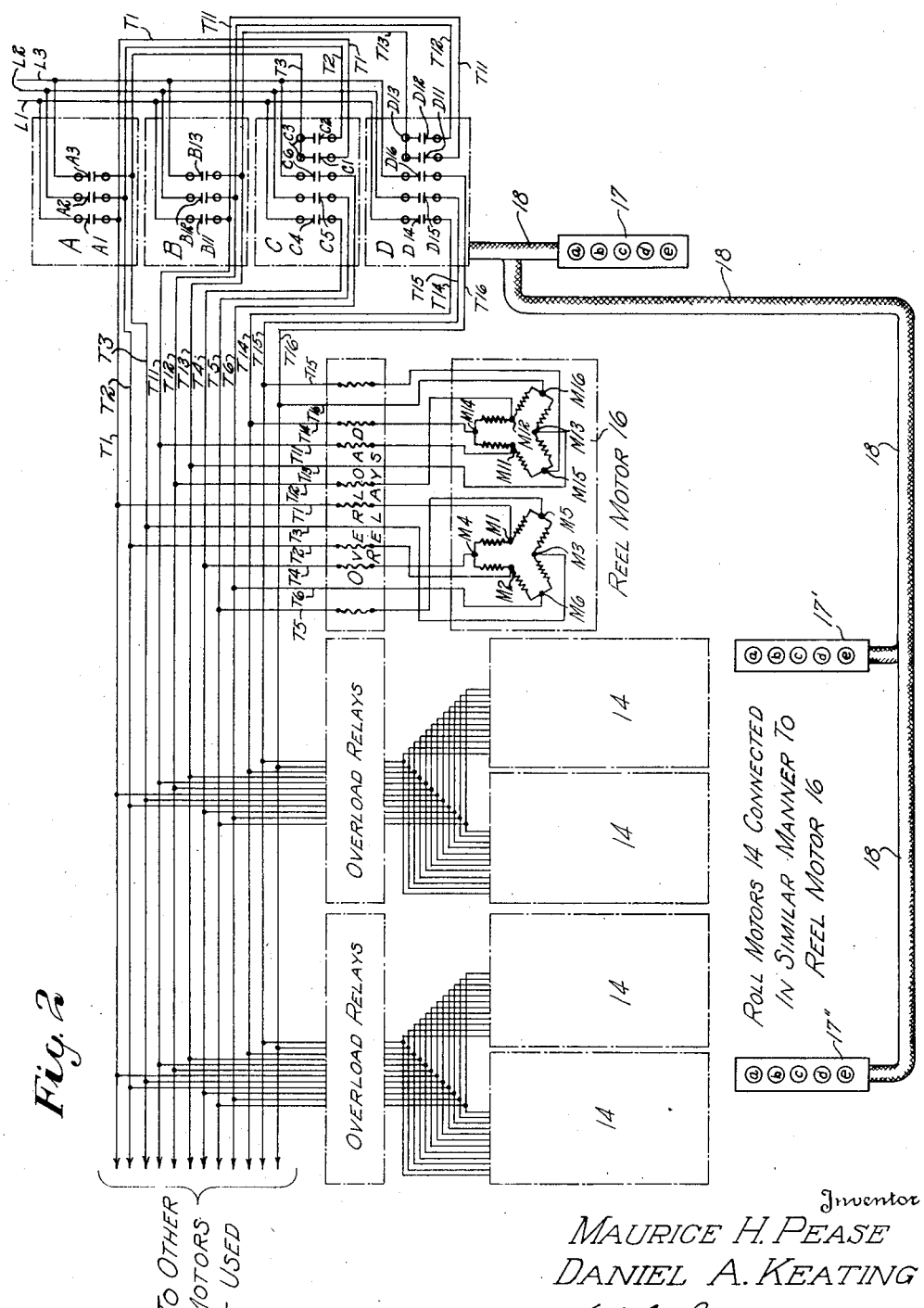

2,131,541

UNITED STATES PATENT OFFICE 2,131,541

ROLLING MILL DRIVE

Maurice H. Pease, New Britain, and Daniel A. Keating, Bridgeport, Conn., assignors to The Stanley Works, New Britain, Conn., a corporation of Connecticut Application August 25, 1936, Serial No. 97,728

7 Claims. (Cl. 80—35)

This invention relates generally to a motor drive for a continuous strip type of rolling mill involving the use of alternating current, induction type, variable speed electric motors.

Heretofore, it has been common practice in rolling mill constructions to pass a continuous strip of metal through a plurality of stands of rolls in spaced tandem relation and to reduce the strip of metal in thickness with a consequent increase in length by adjustably locating each successive pair of work receiving rolls in closer spaced relation. To compensate for the lengthening of the strip during the rolling operation, each set of closer spaced rolls is driven successively faster. It has been usual practice to operate all of these rolls from a motor driven main shaft or to operate the various sets of rolls by individual variable speed motors such as series wound, direct current electric motors controlled by rheostats or by constant speed induction type motors.

The usual source of commercial electrical power is three-phase alternating current. The conversion of alternating current to direct current to provide a power supply for direct current motors requires much expensive and elaborate equipment and results in a power loss. Motors powered by alternating current have not been found well adapted for rolling mill drives since the employment of a variable resistance in the armature circuit of an alternating current motor requires much expensive and elaborate equipment and provides a variable speed motor of low efficiency. Although alternating current motors of the induction type are relatively inexpensive and highly efficient, they are primarily constant speed motors, and to rotate mill rolls by these motors at a speed which is sufficiently slow to start a strip feeding through a rolling mill, during which initial feed the strip may be gauged and secured to a winding drum or coiling machine, results in a very slow subsequent rolling operation with a consequent low rate of production.

It is a well-known fact that alternating current electric motors of the induction type are most dependable and least expensive in maintenance and operation. It is also well recognized that the rotating speed of an electrical motor of this type is a function of the number of stator poles in the motor or of the frequency of supply in the power circuit connected to the motor. It is usually found impracticable to change the frequency of power supply lines. Consequently, the present invention contemplates regulating the number of effective stator poles in each motor to control the operating speed of a rolling mill.

It is, therefore, the principal aim of this invention to overcome the difficulties inherent to prior types of rolling mill drives and provide a simply constructed and effective rolling mill drive involving the use of induction type electric motors adapted to increase the productive speed of the mill without resorting to the use of direct current, variable speed motors, or the elaborate control systems which have been employed heretofore with electrical motor drives.

It is a further object of this invention to employ an induction motor drive associated with a rolling mill which is simple in construction and easy of application and wherein a plurality of motors in said drive may be simultaneously stepped up or down in speed through predetermined selective amounts as desired.

It is a further object of this invention to provide an electrical speed control mechanism for a rolling mill driven by a plurality of polyphase variable speed induction electric motors so that the mill may be started at a very slow speed for adjustment thereof and successively stepped up in speed to a fast rate of operation.

It is a still further object of this invention to employ a plurality of cooperating induction type electric motor drives, each of which is operatively connected to a set of rolls in a rolling mill, and to effectively vary the speed of the motors through corresponding extents by simultaneously changing the number of stator poles in each motor.

With these and other objects in view, our invention accordingly resides in the unique construction and combination of members hereinafter fully described, illustrated in the accompanying drawings, and referred to in the claims appended hereto; it being evident, of course, that various changes in the general form, proportion, and size, as well as other minor details of construction lying within the scope of the claims, may be resorted to without departing from the spirit of the invention or sacrificing any of its advantages.

In the accompanying drawings illustrating one embodiment which our invention may take and wherein like parts are indicated by like numerals:

Figure 1 is a diagrammatic plan view of a rolling mill embodying two spaced stands of rolls and a winding mechanism to receive a strip after it has passed through the rolls; and Fig. 2 diagrammatically illustrates the main power wire connections embodied in a control mechanism for our mill.

In accordance with the present invention, we have provided a rolling mill having a plurality of rolling stands in spaced tandem relation, generally indicated at 10, and each of which supports a plurality of vertically spaced, adjustable power driven rolls 10' arranged to successively reduce a metallic strip 11 to desired thickness. In the present instance, a pair of vertically spaced rolls are illustrated on each stand, but any number of spaced rolls may be employed as required. Only two stands of rolls are included in the present showing, but it will be understood that any number of roll stands may be employed, dependent upon the extent of reduction required in thickness of the strip and the characteristics of the material being rolled.

A winding machine, generally indicated at 12, and including a rotatably supported winding drum 15 operated by a motor 16 coilably receives a strip 11 after it has been suitably reduced in size by passing between the sets of rolls 10'. The roll stands and the machine for coiling the strip may be of any standard and well-known construction and are herein only diagrammatically illustrated since they do not constitute a part of the present invention. In the present instance, the rolls of each stand are each individually rotated by motors 14, but it will be appreciated that a single motor could be employed and suitably connected to simultaneously rotate all of the rolls in one stand without deviating from the present invention.

Each pair of motors 14 on the same roll stand is arranged to rotate the rolls respectively connected therewith in opposite directions and at the same surface rate to cooperatively feed the strip 11 therebetween, and the motors on successive roll stands are suitably power connected as by gears or other means to their respective rolls so that as the strip is reduced in thickness, the successive sets of rolls are stepped up in speed to feed the strip between each set of rolls at a rate commensurate with the linear speed of the strip as it leaves the previous set of rolls. Similarly, winding drum 15 is driven by motor 16 through a suitable friction clutch at a surface speed slightly in excess of the rate of speed with which it leaves the final set of rolls, thus preventing any tendency of the strip to become too slack or to be too tightly tensioned between adjacent sets of rolls or between the winding drum and the last set of rolls. It will be understood that the adjustment of the roll spacing not only serves to regulate the reduction in thickness of the strip, but also regulates the extent of slack of the strip between adjacent stands.

Motors 14 and 16 are preferably of the polyphase induction type and are herein illustrated as of the three-phase type. A remotely controlled electrical system regulated by one or more sets of push buttons, as shown in Fig. 2, serves to selectively and simultaneously electrically connect the stator coils of each of the motors so that it has the same number of effective stator poles, thus serving to operate all of the motors at desired predetermined speeds which may be stepped up or down as required. In the present instance, the electrical circuit connecting the motors involves the use of four pole changing switches, diagrammatically illustrated at A, B, C, and D, and respectively providing low, second, third, and high motor operating speeds. These switches are under selective control of the corresponding push buttons $a$, $b$, $c$, and $d$ and a stop button $e$ to simultaneously regulate the speeds of all of the motors. We preferably employ a similar set of push buttons at each roll stand or at other convenient locations, it being understood that the corresponding buttons are electrically connected in parallel and accomplish the same result. Hence, any desired number of remote controls may be located wherever desired. It will be evident, of course, that induction motors having a suitable number of stator poles may be similarly controlled through a greater or lesser number of speeds in the same general manner and by employing a suitable number of pole changing switches and push buttons connected in the same general manner as herein shown.

In accordance with the usual practice in the construction of remotely controlled switches, these pole changing switches are arranged to be individually operated through a series of relays which in turn are selectively operated by the push buttons. These relays are not herein illustrated, nor are their individual connections with the push buttons and the switches shown, since such connections are of a conventional and well-known type and such a showing would only tend to confuse the main wiring diagram herein illustrated. It will be noted that in Fig. 2 each of the respective pole changing switches is outlined in dot and dash lines and the sets of push buttons are respectively mounted in junction boxes 17, 17' and 17" suitably located on the winding and roll stands and connected by a cable 18 to the various switches. Hence, an operator may watch the functioning of each roll stand and yet maintain the mill under instant control.

In accordance with usual construction, it will be appreciated that when any button is depressed, it first serves to open any pole changing switch which may be closed and thereafter closes the switch corresponding to itself. In other words, assuming that button $a$ has been depressed to operatively close switch A, thus starting the motors operating at their lowest speed, and button $b$ is thereafter depressed, switch A is first opened and switch B is thereafter closed. The other push buttons are similarly connected to correspondingly control the other motor speeds. Button $e$ simply serves to simultaneously act through all of the relays and open any of the pole changing switches which may be closed, thus simultaneously disconnecting the current to all of the motors and bringing the rolling mill to a stop.

In the operation of our mechanism, button $a$ is first depressed to start the mill operating at its lowest speed. At this time, current is free to flow from the three-phase power lines L1, L2, L3 through the respective closed contacts A1, A2, and A3 of switch A and communicates with the stator coil terminals M1, M2, and M3 of each motor through lead wires T1, T2, and T3. To obviate the possible confusion of wiring and connections, only the individual wiring connections to the reel motor 16 are illustrated, but it will be understood that each of the roll motors 14 are connected in the same manner, with the exception that one of the motors 14 on each stand is reverse connected so that each pair of rolls will rotate in proper feeding direction. It will also be noted that overload relays are indicated for each motor. These relays are not shown in detail since they are conventionally constructed and connected to open any power switches which may be closed in the event that any of the motors is subjected to an excessive load.

After the mill is operating at low speed, a strip of stock to be rolled is suitably located and one end thereof is fed between the first set of rolls and then through successive sets of rolls and onto the winding drum 15. The initial low speed of the mill is preferably sufficiently slow so that the mill operator may gauge his strip 11 during rolling and adjust the distance between the rolls to provide the desired final work reduction as well as to relieve undue tensions on the strip and to prevent it from becoming too slack between adjacent roll stands. Making these various adjustments at a very low mill operating and winding drum operating speed makes it possible to secure the end of the strip on the winding drum 15 without stopping the mill; saves unnecessary strains and stresses on the mill; keeps the possible spoilage of stock being rolled at a minimum, and saves the delay occasioned heretofore by frequently stopping and starting the mill for adjustments.

When the mill is satisfactorily performing at a low speed, button b is depressed to shift all of the motors simultaneously to second speed. At this time, the contacts of switch A are opened, and thereafter line wires L1, L2, and L3 respectively connect stator coil terminals M11, M12, and M13 through closed contacts B11, B12, and B13 of switch B and through leads T11, T12, and T13, thereby simultaneously changing the number of effective stator poles in each motor and correspondingly changing the speeds of all of the motors.

Depression of button c similarly opens the contacts of switch B and shifts the motors to third speed, at which time a different number of stator poles are connected in the power circuit. At this time, line wires L1, L2, and L3 respectively connect through closed contacts C4, C5, and C6 of switch C and leads T4, T5 and T6 with stator terminals M4, M5, and M6, and stator terminals M1, M2, and M3 are interconnected through wires T1, T2, and T3 and closed contacts C1, C2, and C3 of switch C.

To attain the fourth and maximum operating speed, button d is depressed, serving to first open switch C and thereafter to simultaneously close contacts D14, D15, D16, D11, and D12, and connect line wires L1, L2, and L3 respectively with stator terminals M14, M15, and M16 through leads T14, T15, and T16. Closed contacts D11 and D12 also interconnect the stator terminals M11, M12, and M13 at the same time through leads T11, T12, and T13. Hence, it will be noted that switch D serves to again change the number of effective stator poles in each motor, simultaneously shifting all the motors to top speed.

In the event it is desired to reduce the operating speed of rolling, it will be appreciated that any of the push buttons controlling a lower speed of the mill may be depressed, whereupon the switch operatively connected to the motors will immediately become disengaged and the switch associated with said push button will connect a desired number of stator coils of each motor in the circuit, causing the motors to simultaneously and gradually reduce in speed at approximately the same rate since the electrical connections made to said motors by simultaneously reducing their speeds will cause each motor to act as an electrical brake. It will be appreciated, of course, that if it is desired to bring the rolling mill to a complete stop, it is only necessary to depress button e whereupon any of the pole changing switches which may be closed will instantly be thrown to open position.

We claim as our invention:

1. In a rolling mill having a plurality of sets of rolls adapted to receive a continuous strip of metal and reduce it in thickness, induction type electric motors respectively connected in operative driving relation with said sets of rolls, and means to simultaneously change the number of effective stator poles in each motor whereby the speed of rolling may be varied through a predetermined amount without upsetting the speed ratio between the various sets of rolls.

2. In a rolling mill, a plurality of sets of rolls located in spaced tandem relation and arranged to roll a continuous metallic strip and reduce it in thickness with a corresponding increase in length, an induction type electric motor arranged to individually drive each set of rolls, each of said motors being provided with the same number of stator coils, and switching mechanism arranged to simultaneously connect different and predetermined numbers of said stator coils in an electrical power circuit whereby the speed of rolling may be changed through predetermined extents without altering the speed ratio between the various sets of rolls.

3. In a rolling mill, a plurality of sets of rolls in spaced tandem relation and arranged to roll a continuous strip of metal to reduce it in thickness and correspondingly increase it in length, polyphase induction type electric motors individually connected with each roll of each set, said motors having the same number of correspondingly arranged stator coils and stator poles, a plurality of pole changing switches selectively connectible to a source of electrical power and to predetermined stator coils of each motor in such manner that the selective operation of any of said switches will simultaneously provide the same number of effective stator poles in each motor and change the operating rate of the rolling mill.

4. In a rolling mill, a plurality of sets of rolls located in spaced tandem relation and arranged to cooperatively and continuously roll a strip of metal to reduce it in thickness and increase it in length, an induction type electric motor individually connected with each roll of each set, each of said motors having the same number of stator coils, a plurality of pole changing switches connected to a source of electrical power and to the stator coils of said motors in such manner that the closing of any of said switches will provide the same number of effective stator poles in each motor, and means to remotely and selectively shift said switches whereby the speed of rolling may be simultaneously changed through predetermined extents without affecting the speed ratios between the various sets of rolls.

5. In a rolling mill, a plurality of spaced aligned rolling stands, each stand having a plurality of spaced rolls through which a continuous metallic strip may be passed for reduction in thickness with a corresponding increase in length, a plurality of polyphase induction type electric motors on each stand, said motors being operatively connected to rotate the strip engaging rolls in opposite directions and at the same surface rate, each of said motors having the same number of stator coils and providing the same number of stator poles, switching mechanism arranged to simultaneously and selectively connect the same number of stator coils in each motor with an electrical power circuit, and electrical means to shift said switching mechanism whereby each motor is provided with a plurality of speeds and the entire operating speed of the rolling mill may be simultaneously changed through predetermined extents without affecting the speed ratio between various stands of rolls.

6. In a rolling mill, a plurality of sets of rolls located in spaced tandem relation and arranged to cooperatively receive a strip of metal to reduce it in thickness and increase it in length, polyphase induction electric motors respectively connected to each of said rolls, winding means adapted to receive the strip after it has passed through said sets of rolls, a polyphase induction motor operatively connected to said winding means, each of said motors having similarly arranged stator coils and stator poles, a plurality of pole changing switches, a series of push buttons arranged to remotely and selectively control the operation of said switches, each switch serving to connect the stator coils and provide the same number of effective stator poles in each motor for controlling the operative speeds of said motors, and a remote push button control arranged to disengage any of said switches which may be closed to simultaneously bring all the motors to a stop.

7. In a rolling mill having a plurality of sets of rolls adapted to receive a continuous strip of metal and reduce it in thickness, winding means adapted to receive the strip after it has passed through said sets of rolls, induction type electric motors respectively connected in operative driving relation with said sets of rolls and said winding means, and means to simultaneously change the number of effective stator poles in each motor, whereby the speed of rolling and winding may be varied through a predetermined amount without upsetting the speed ratio between the various sets of rolls and the winding means.

MAURICE H. PEASE.
DANIEL A. KEATING.